United States Patent [19]

Friedenreich et al.

[11] 3,845,908

[45] Nov. 5, 1974

[54] CONVEYOR MACHINE FOR SUSPENSIONS AND VISCOUS MATERIALS HAVING A CAGE-LIKE HOUSING

[75] Inventors: Heinrich Friedenreich, Limburgerhof; Bernhard Suck, Luwigshafen; Juergen Reitsch, Bochum, all of Germany

[73] Assignee: Badische Anilin- & Soda-Fabrik Aktiengesellschaft, Ludwigshafen/Rhein, Germany

[22] Filed: Oct. 16, 1972

[21] Appl. No.: 297,633

[30] Foreign Application Priority Data
Oct. 22, 1971   Germany.............................. 2152704
Apr. 15, 1972   Germany.............................. 7214292

[52] U.S. Cl............. 241/46.11, 241/185 A, 241/299
[51] Int. Cl............................................. B02c 13/10
[58] Field of Search............. 241/46.11, 46.17, 294, 241/299, 300, 185 A

[56] References Cited
UNITED STATES PATENTS
| | | | |
|---|---|---|---|
| 1,624,886 | 4/1927 | Borton | 241/299 X |
| 3,095,916 | 7/1963 | Jacobsen | 241/299 X |
| 3,582,008 | 6/1971 | Motz | 241/299 X |

FOREIGN PATENTS OR APPLICATIONS
| | | | |
|---|---|---|---|
| 207,329 | 9/1966 | Sweden | 241/299 |

*Primary Examiner*—Granville Y. Custer, Jr.

[57] ABSTRACT

A comminuting conveyor machine for suspensions and viscous non-homogeneous materials having a rotor for the transport of material and a perforated housing consisting of individual bars forming with the rotor a shear zone, which bars are provided with replaceable highly abrasion-resistant shaped members inserted therein.

5 Claims, 6 Drawing Figures

CONVEYOR MACHINE FOR SUSPENSIONS AND VISCOUS MATERIALS HAVING A CAGE-LIKE HOUSING

This invention relates to units or pumps suitable for conveying and treating viscous liquids, suspensions and free-flowing solids and having a rotating conveyor element which also has a comminuting action in the shear zone formed between the rotor and the cage-like housing comprising a wall provided with perforations.

There are pumps which have as rotor an inclined disc which is surrounded by a cage-like stator, the wall of which is perforated, at least over part of its area, with holes which are preferably in the form of slots. Such pumps are used for conveying liquids mixed with solids and for conveying similar viscous materials, the solid materials contained in said liquids being comminuted by trituration between the rotor and the cage and/or by impact against baffles until they are able to pass through the perforations in the cage. Such machines may have, in place of an inclined disc, an impeller or a short single-threaded or multi-threaded deep-cut conveyor worm. Comminuting pumps of this kind are used, for example, for conveying naphthalene mixed with petroleum coke of a wide range of particle sizes. A particularly satisfactory type of rotor for such a machine which is used for this purpose is a multi-bladed impeller having rectangular radial blades. Between the impeller and the cage-like housing there is an annular space having a radial thickness suitable for the particle size of the suspended material being treated. A flow of suspension is formed in this annular space and the particles of coke are flung against the bar-shaped elements of the cage by centrifugal force to be comminuted as a result of impact or friction.

In one known design, the cage-like housing of a comminuting conveyor machine of this kind consists of a cylindrical steel wall in which slots have been cut in the axial direction, the inner surface of said wall being provided with a large number of protuberances produced by cutting away material from said steel wall. Similar housings for comminuting conveyor machines are also known in which the perforated wall is composed of individual bar-shaped and annular elements fitted together in a manner suitable to the job in hand, all of these elements being held in position by tie-rods and rings. In this case, the protuberances employed to facilitate comminution are preferably located on the bar-shaped elements extending along generatrices of said housing.

Whatever the construction, the protuberances are subjected to a high degree of attrition. It has already been proposed to minimize wear by using metal bars of, say, square section, which bars are welded to the housing. However, the choice of abrasion-resistant materials which are also weldable is limited.

It is an object of the present invention to provide a cage for comminuting conveyor machines, which cage is provided with highly abrasion-resistant protuberances at the cylindrical surface of the stator, said protuberances being replaceably fitted so that the use of non-weldable special materials is possible. The use of extremely wear-resistant materials for the above-mentioned machines is necessary especially in cases where the material to be comminuted is of very large particle size, e.g. in waste disposal and incineration. To ensure long maintenance-free operation in conveying other substances, e.g. sugar-cane digestion products, it is also necessary to use highly abrasion-resistant material for the cam-like protuberances inside the housing.

The bar-shaped elements which hold the replaceable protuberances should be designed so as to make it possible to employ varying numbers of protuberances in varying sections and in varying distributions around the periphery of the stator as required for the various tasks to be performed by the conveyor machine.

According to the invention, these objects are achieved by the use of shaped members which are inserted with a loose or force fit into the inner surface of the axially extending bar-shaped carrier elements forming a cage, which shaped members form cam-like protuberances pointing inwardly from the periphery of the cage toward the axis of rotation. Further, according to the invention, the said shaped members either possess a toothed profile or essentially triangular or trapezoid cross-section or a number of such shaped members, when aligned, form a toothed rack of highly abrasion-resistant material. The individual shaped members or the rack-like groups of shaped members are connected to the bar-shaped elements of the cage preferably by means of a dove-tail tongue-and-groove joint.

An embodiment of the invention is illustrated in the accompanying drawings.

Figure 1:
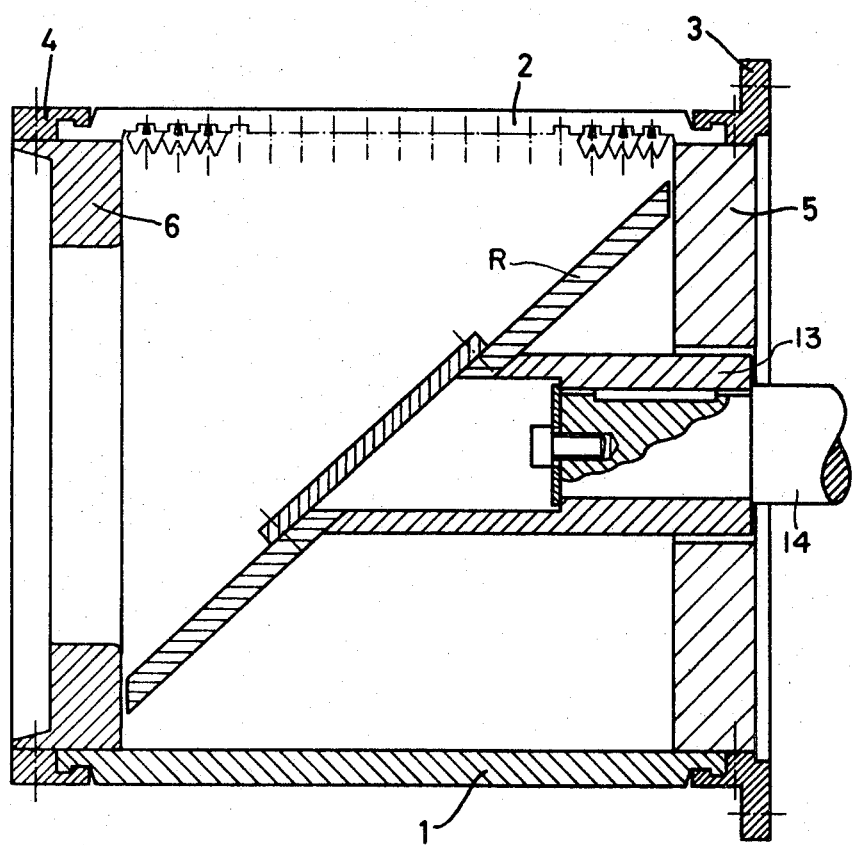
FIG. 1 is a longitudinal section through the axis of rotation of the comminuting conveyor machine constructed in accordance with the present invention.
Figure 1A:
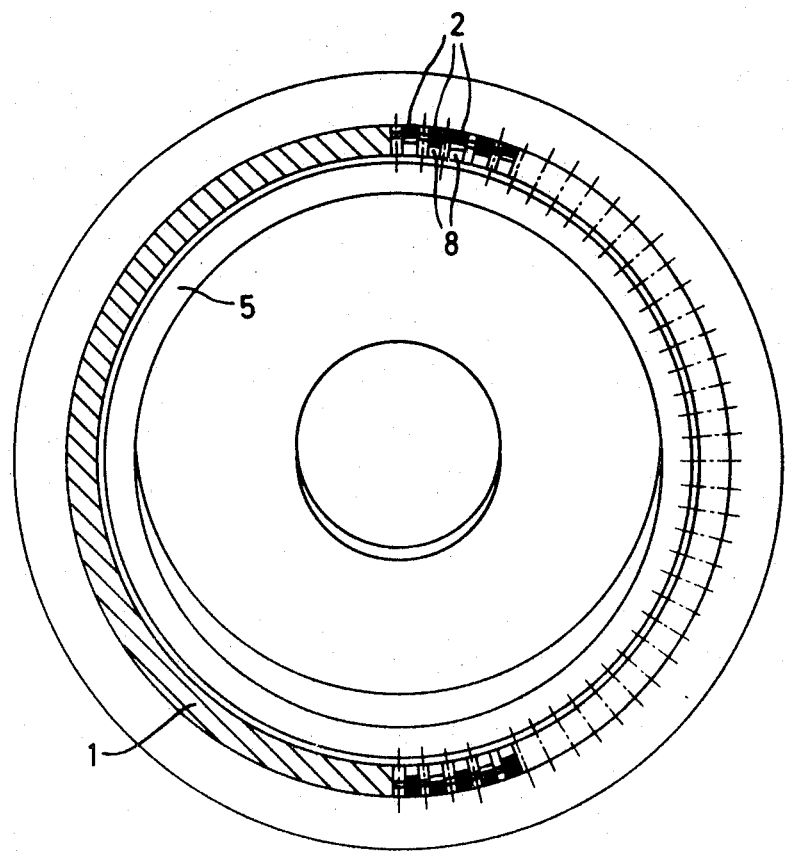
FIG. 1a is a cross-section taken transversely of the axis of rotation of the machine shown in FIG. 1.

FIG. 1 is an axial section of the housing of a conveyor machine comprising an inclined disc R as the rotor, the corresponding cross-section being shown in FIG. 1a. A specific portion of the housing wall, for example about one-half of its circumference, is in the form of a non-perforated shell 1. The remainder of the housing wall consists of bars 2 which extend along generatrices to form a cage and are held together either by flanged rings 3 or cylindrical rings 4. The open side walls of the cage are formed by annuli 5 and 6 having outside diameters approximately equal to the inside diameter of the said cage, the ends of the bars 2 being tightly held between the rings 3 and 5 and rings 4 and 6 respectively.

Figure 2:
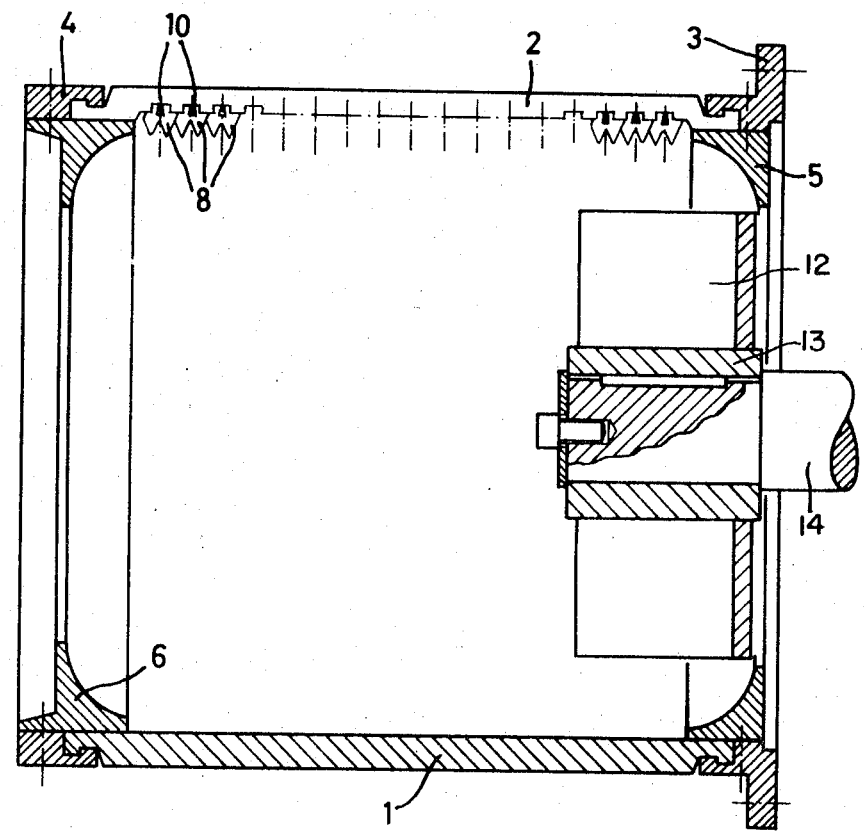
FIG. 2 is a longitudinal section of another similar embodiment of the machine of the invention.
Figure 2A:
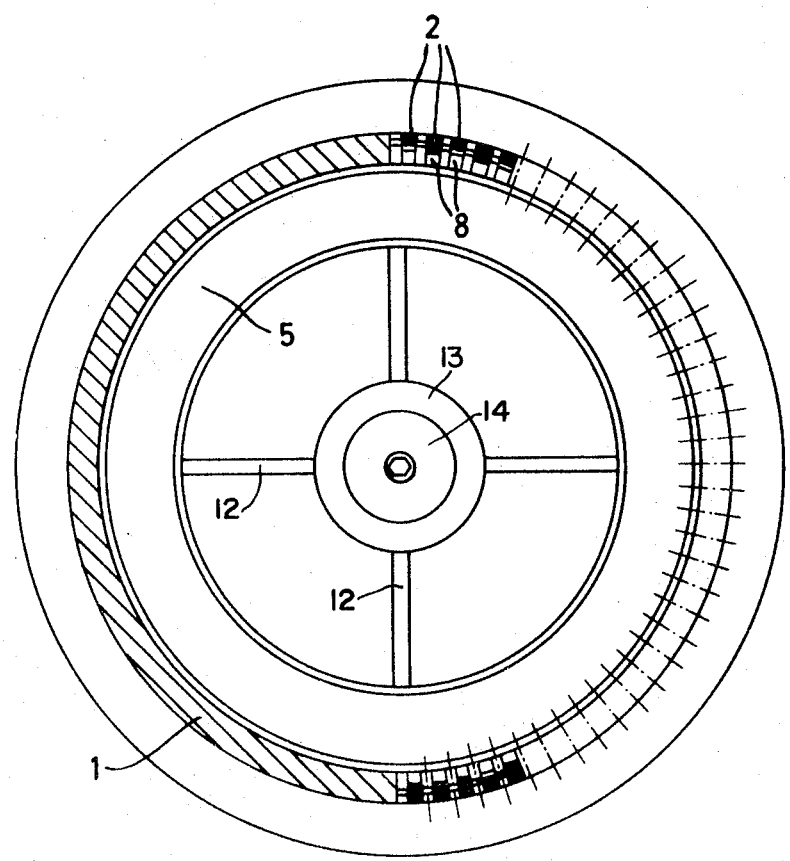
FIG. 2a is a transverse cross-section of the machine shown in FIG. 2.

FIGS. 2 and 2a show a substantially similar machine provided with a multi-blade rotor, especially a four-blade rotor. The rectangular blades 12 are fixed to the nave 13 on the shaft 14.

Figure 3:
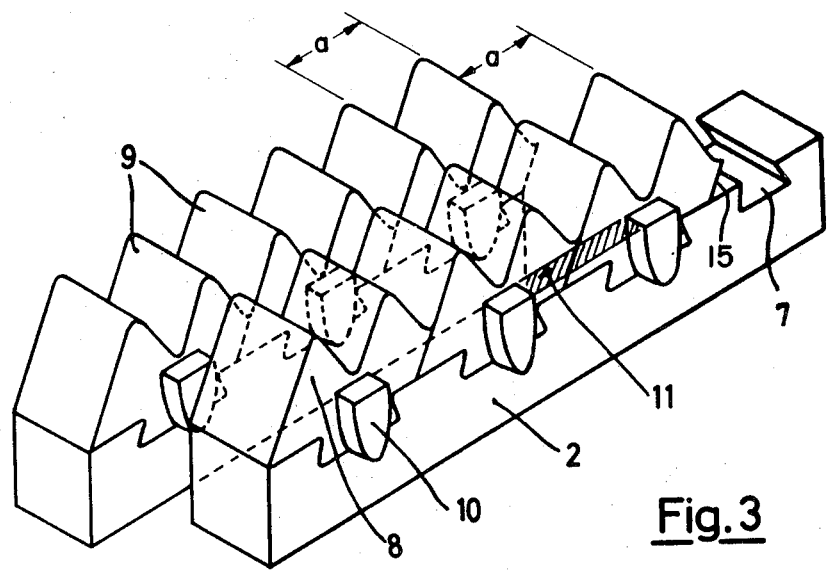
FIG. 3 is an enlarged perspective view of one pair of cage bars constructed in accordance with one embodiment of the invention.

FIG. 3 is a view of the bars 2 of the cage with the abrasion-resistant protuberances 9 in position. In the embodiment illustrated, each pair of protuberances 9 of triangular cross-section forms an integral shaped member 8 which is inserted into dove-tail grooves 7 in the bars, each shaped member overlapping the adjacent member over a bevelled area 15 provided on one side of each member at the same angle as that of the flanks of the protuberance 9. If desired, the shaped members 8 may show a different profile, for example they may have a rectangular or trapezoid cross-section. To fix the position of the shaped members 8 in bars 2 adjacent to each other on the inner surface of the cage, these abrasion-resistant shaped members are provided, independently of their profile, with projections 10 whose end face bears against the side of the adjacent shaped member on the adjacent bar, the shaped members being preferably in staggered relationship to each other from bar to bar. The stagger between the shaped members 8 with their projections 10 may be by the whole distance "a" between the protuberances 9 of each member or by only a fraction of said distance, as desired. In the former case, the protuberances 9 are in alignment in the peripheral direction, whilst in the latter case (not illustrated) they show a specific amount of stagger relatively to each other from bar to bar. This means that the shaped members will be fixed in position in the bars even if their dove-tail tongues do not fit tightly in the grooves in the bars 2. The projections 10 on the shaped members 8 on adjacent bars 2 delimit a plurality of openings 11 through which the material can pass. The size of these openings 11 depends on the desired fineness of the material to be comminuted.

The arrangement of the shaped members 8 on the bars 2 of the cage and the method of securing the same may be varied in many ways other than that described in the present example. For example, the pitch and size of the abrasion-resistant protuberances 9 may be chosen so that a rotor having an appropriate profile over its peripheral surface may pass through the gaps between said protuberances, in which case there will be no staggering of the protuberances 9 from bar to bar 2. However, for the purpose of conveying a suspension of petroleum coke of various particle sizes in naphthalene accompanied by comminution of the coke particles in the many zones of impact and shear between the rotor and the perforated housing wall, it is not necessary for a profiled rotor to comb through the gaps of the toothed abrasion-resistant peripheral surface of the stator.

Figure 4:
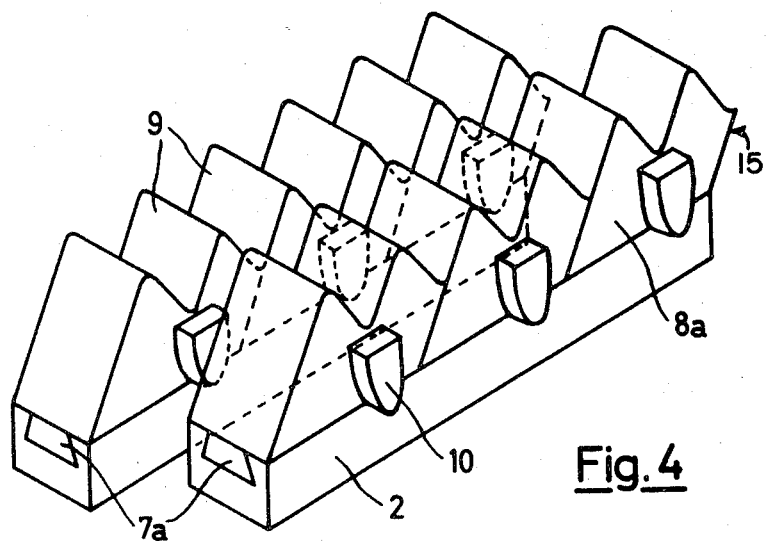
FIG. 4 is another enlarged perspective view of a different pair of cage bars also constructed in accordance with the invention.

FIG. 4 shows an embodiment in which the dove-tail grooves 7a are not arranged perpendicularly to the direction of the bars 2 but have been milled into the latter along their whole length. Nevertheless the shaped members 8a provided with an integral longitudinal dove-tail section are furnished with projections 10 to ensure mutual support of the combinations of members 2 and 8.

We claim:

1. In a comminuting conveyor machine for suspensions, viscous materials and free-flowing solids having an internal conveying rotor and a peripheral cage-like housing stator comprising a plurality of axially extending bar and annular elements fitted together, the improvement of a plurality of tooth-shaped abrasion-resistant members replaceably retained by tongue and groove engagement on the inner surface of each of said plurality of axially extending bar to form a corresponding plurality of profiled toothed racks pointing inwardly from the periphery of the stator toward the axis of rotation, to form a shear and impact zone between themselves and the conveying rotor, each of said tooth-shaped members having an integral, abrasion-resistant projection on its side surface which bears against the side of an adjacent tooth-shaped member on the next adjacent bar, the projections along each profiled toothed rack thereby providing axially spaced annular openings between adjacent bars for the passage of the material being treated.

2. A conveyor machine as claimed in claim 1 wherein the tooth-shaped members have an essentially triangular cross-section.

3. A conveyor machine as claimed in claim 1 wherein each of said tooth-shaped members is retained on its bar by means of a dove-tail tongue-in-groove connection, the groove extending perpendicularly to the axially extending bar.

4. A conveyor machine as claimed in claim 1 wherein each of said tooth-shaped members is retained on its bar by means of a dove-tail tongue-in-groove connection, the groove extending parallel to the axially extending bar.

5. A conveyor machine as claimed in claim 1 wherein each tooth-shaped member has an undercut lower segment bevelled at the same angle as the flank of the next adjacent tooth such that said undercut segment overlaps the lower portion of said flank in close fitting relationship.

* * * * *